United States Patent
Hofmann et al.

(10) Patent No.: US 6,988,939 B2
(45) Date of Patent: Jan. 24, 2006

(54) HAND-GUIDED ELECTRIC TOOL COMPRISING A GUARD

(75) Inventors: Albrecht Hofmann, Steinbronn (DE); Harald Krondorfer, Ludwigsburg (DE); Markus Heckmann, Filderstadt (DE); Thomas Schomisch, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 403 days.

(21) Appl. No.: 10/333,044

(22) PCT Filed: Apr. 18, 2002

(86) PCT No.: PCT/DE02/01434
§ 371 (c)(1),
(2), (4) Date: Jan. 15, 2003

(87) PCT Pub. No.: WO02/094504
PCT Pub. Date: Nov. 28, 2002

(65) Prior Publication Data
US 2004/0014412 A1 Jan. 22, 2004

(30) Foreign Application Priority Data
May 18, 2001 (DE) .......................... 101 24 439

(51) Int. Cl.
*B24B 23/00* (2006.01)

(52) U.S. Cl. ........................ 451/344; 359/451
(58) Field of Classification Search ................ 451/344, 451/357, 359, 451, 456, 457
See application file for complete search history.

(56) References Cited

U.S. PATENT DOCUMENTS 4,574,532 A * 3/1986 Haberle et al. .............. 451/451
5,005,321 A * 4/1991 Barth et al. .................. 451/359
6,669,544 B1 * 12/2003 Walz et al. ................... 451/454
6,699,114 B1 * 3/2004 Booeshaghi et al. ........ 451/451

FOREIGN PATENT DOCUMENTS

| DE | 3638337 | * | 5/1988 |
| DE | 3940584 | * | 6/1991 |
| DE | 198 29 190 A | | 1/2000 |

* cited by examiner

Primary Examiner—Eileen P. Morgan
(74) Attorney, Agent, or Firm—Michael J. Striker

(57) ABSTRACT

In a hand-guided electrical tool 3 with a housing 2 that has a receiving collar 20 embodied on it and with a guard hood 1 that can be attached to the receiving collar 20 and has a clamping strap 16, which can move freely around the receiving collar 20 in a first position and rests snugly against the receiving collar 20 in a second position, a secure connection between the guard hood 1 and the housing 2 is achieved by virtue of the fact that the receiving collar 20 has at least one protrusion 21, which protrudes beyond the second area in the radial direction away from the spindle axle 5, and between the protrusion 21 and the housing 2, there is a distance h, which approximately corresponds to the width b of the clamping strap 16, and by virtue of the fact that that the clamping strap 16 has at least one indentation 12 so that the first diameter d1 of the opening 10 of the clamping strap 16 in the vicinity of the indentation 12 is greater than the second diameter d2 in the remaining region, wherein the first diameter d1 is of such a size that the clamping strap 16 can be moved over the protrusion 21 and the second diameter d2 is of such a size that the clamping strap 16 cannot be moved over the protrusion 21.

9 Claims, 6 Drawing Sheets

HAND-GUIDED ELECTRIC TOOL COMPRISING A GUARD

BACKGROUND OF THE INVENTION

The invention is based on a hand-guided electrical tool with a housing and a guard hood.

Right angle grinders with a guard hood are known, whose clamping strap has a projection on the inside. The clamping strap of the guard hood can be attached to a receiving collar, which is disposed around a spindle axle for a rotating insert tool. The projection engages in a groove in the receiving collar of the machine. As a result, the projection assures that the guard hood does not detach from the receiving collar during operation. This is also the case even if the locking element, which presses the clamping strap against the receiving collar, opens. This increases the safety of the right angle grinder and reduces the risk of injury that it represents since the guard hood cannot fall off. For example, it is known to use screws, quick-action levers, or the like as locking elements. It is also known to bring projections of different widths on the clamping strap into engagement with correspondingly embodied grooves in the receiving collar of the machine. The combination of various projections produces a coding so that particular guard hoods only fit particular machines with a receiving collar adapted to them. As a result, a guard hood with a particular diameter can only be used in connection with a particular tool diameter. In addition, this permits a guard hood to be matched to a corresponding machine, which has a particular speed of the insert tool. Usually in small right angle grinders or single-handed right angle grinders, the receiving collar of the machine is only slightly bigger than a support flange, which supports the insert tool on its side oriented toward the machine. As a result, in order to mount the guard hood on the right angle grinder, it is first necessary to remove the support flange since the internal projections of the clamping strap do not fit over the support flange. After the guard hood has been mounted, the support flange must be reattached to the right angle grinder. This is a very time-consuming process. In right angle grinders that have a quick-action attachment in the support flange, it is impossible for the user to remove the support flange. Such devices cannot be equipped with guard hoods that have a projection oriented toward the machine.

SUMMARY OF THE INVENTION

An electrical tool according to the invention has the advantage over the prior art that the guard hood provided with the features according to the invention can also be mounted on an electrical tool, a particular a right angle grinder, whose support flange cannot be removed and in which the support flange diameter is only slightly smaller than the diameter of the machine's receiving collar for the guard hood. This is made possible by virtue of the fact that the clamping strap is slid with its recess over the protrusion of the receiving collar until it is situated entirely beneath the protrusion and is then rotated around the drive axis in relation to the receiving collar, and by virtue of the fact that the guard hood has no elements, which have a smaller diameter than that of the receiving collar. As a result, beneath the protrusion, there is a region of the clamping strap in which the clamping strap does not have any recess. Consequently, the guard hood is prevented from moving out of the way in the axial direction. The free rotation of the clamping strap in relation to the receiving collar is assured by virtue of the fact that the width of the clamping strap corresponds approximately to the distance between the protrusion and the housing.

It is advantageous if the protrusion and the recess are disposed so that the guard hood can be slid over the protrusion only in a position in which it does not make sense to operate the electrical tool. This prevents the guard hood from unintentionally coming off when it is in the working position, even when the clamping element is released. This increases user safety and reduces the risk of injury.

It is also advantageous if the protrusion and/or the recess are the shape of circular segments in the axial direction of the spindle axle. Such a design is particularly easy to produce and is also safe to use.

It is also advantageous if the clamping element forms recess. As a result, the clamping element can be used to slide over the protrusion on the receiving collar. Such an embodiment is particularly easy to produce since the clamping element is as a rule embodied as a moving part, which is particularly easy to provide with such a shape.

It is also advantageous if the electrical tool has a number of protrusions and recesses, which are disposed at reciprocally matched distances. In a particularly advantageous manner, this makes it possible for the guard hood to be coded for use with particular electrical tools. In principle, the same shape can be used here for all of the protrusions and recesses, but a large number of different codings is still possible. In contrast to the case in which there is only a single form for the protrusion and the recess, where very complex forms would be required.

It is also advantageous if the protrusions and recesses each have different, reciprocally matched sizes and/or distances from one another. This makes it possible to produce still more variations for the coding of the guard hood since both the sizes and the distances can be varied.

It is also advantageous if the electrical tool has a support flange, which is disposed concentrically around the spindle axle and whose diameter is only slightly smaller than that of the receiving collar. This assures a good support of the insert tool, wherein the contact surface on the support flange is enlarged in relation to the prior art. Previously, because of the projections pointing inward from the clamping strap, either the support flange had to be significantly smaller than the receiving collar or else the support flange had to be removed in order to install the guard hood.

The invention will be explained in detail in the description below in conjunction with an exemplary embodiment shown in the drawings.

DESCRIPTION OF THE PREFERRED EMBODIMENT

Figure 1:
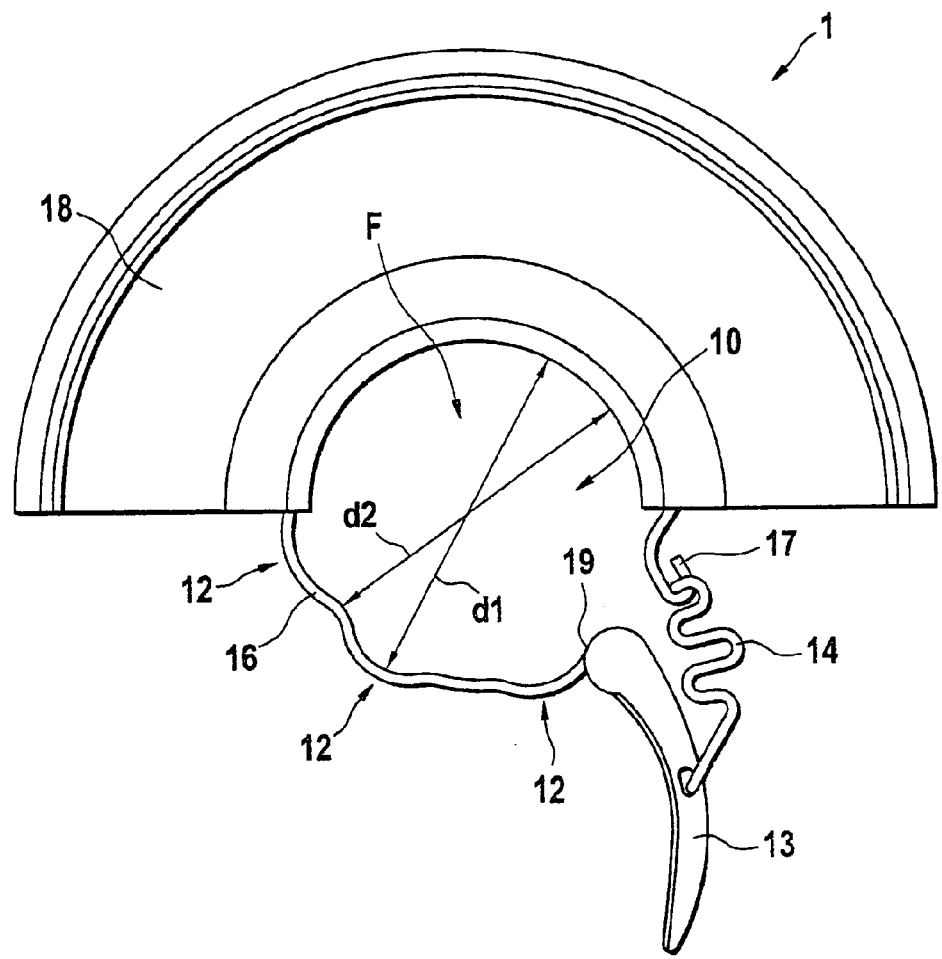
FIG. 1 shows a top view of a guard hood according to the invention.

In the following, identical parts are provided with the same reference numerals.

Figure 2:
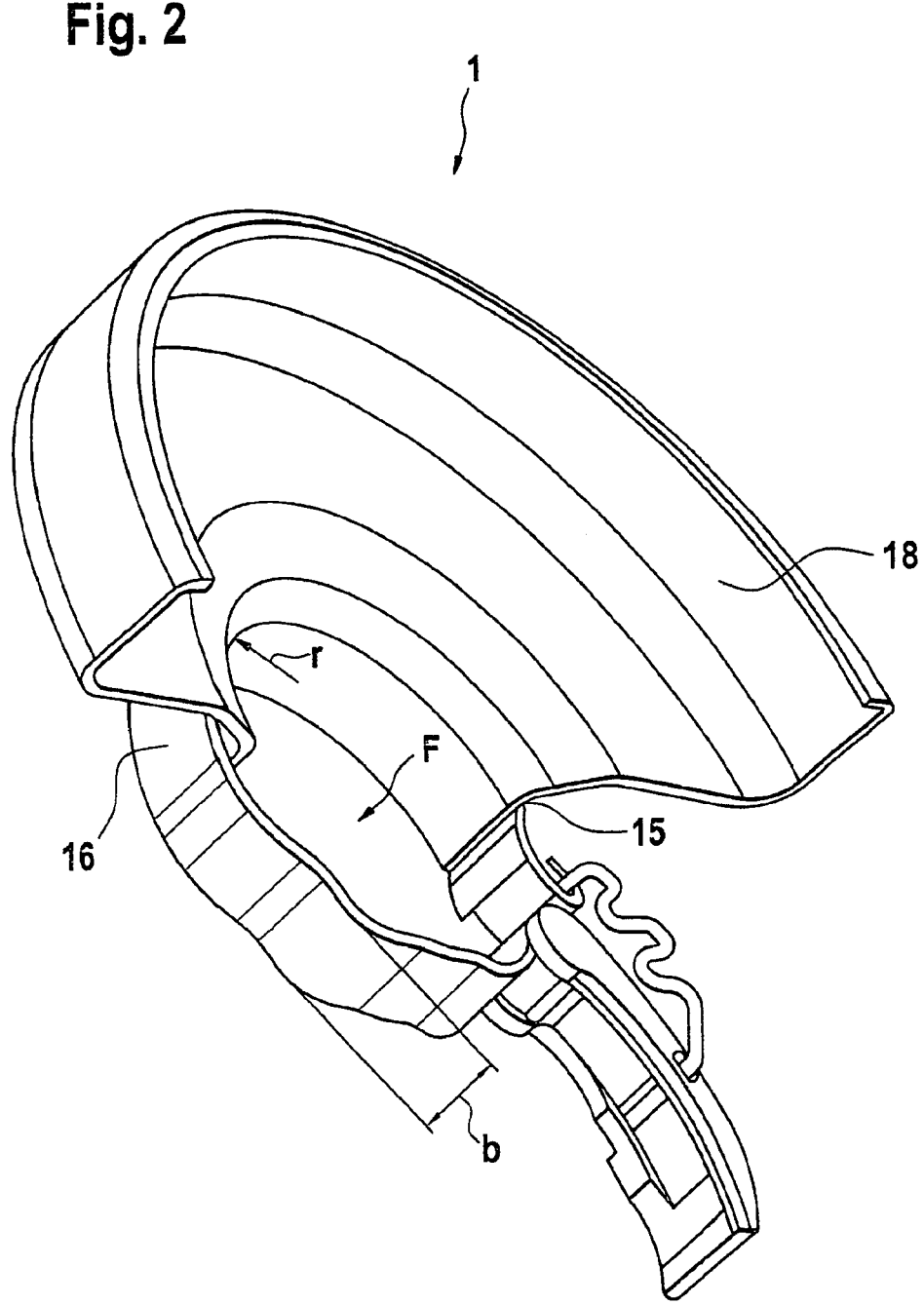
FIG. 2 is a perspective view of the guard hood from FIG. 1.

FIGS. 1 and 2 show two views of a guard hood 1 for a hand-guided electrical tool 3, in the current instance a right angle grinder (FIGS. 5 to 8). The guard hood 1 has a flat, semicircular hood part 18, to which a clamping strap 16 is attached by means of a transition 15 so that between the clamping strap 16 and the hood part 18, an opening 10 is formed. This opening 10 has a changeable area F. A clamping element 13, 14 is affixed to the clamping strap 16 in order to change the area F. The clamping strap 13, 14 here is comprised of a clamping lever 13, which is rotatably supported on a first end 19 of the clamping strap 16, and, by means of a spring 14 rotatably supported on the clamping lever 13, cooperates with a second end 17 of the clamping strap 16. The second end 17 is curved so that it forms a counterpart support for the spring 14. When the clamping lever 13 is rotated, this changes the area F of the opening 10 by moving the two ends 19, 17 of the clamping strap 16 either closer together or further apart from each other. This principle is known and is therefore not discussed in detail here.

The clamping strap 16 is not embodied in the shape of the circumference surface of a cylinder, which would correspond to an unchanged second diameter d2 of the opening 10, but rather has several recesses 12, in which a first diameter d1 of the opening 10 is greater than the second diameter d2. In the exemplary embodiment depicted, three recesses 12 are embodied on the clamping strap 16. These are the shape of circular segments when viewed from above. In addition, the region of the clamping element 13, 14 is likewise embodied as a recess 12. This is achieved by virtue of the fact that the clamping strap 16, in the vicinity of its second end 17, is not formed along a circular arc of the opening 10, but is bent outward away from the center of the opening 10.

The clamping strap 16 has a width b and is fastened to the hood part 18 in the usual, known manner. In the vicinity of the hood part 18 that adjoins the cylindrical region in which the hood part 18 is attached to the clamping strap 16, a transition region 15 is provided. In the current exemplary embodiment, this transition region 15 is embodied in the form of a radius r. The geometry of the transition region is significant for preventing detachment in the event of a released clamping element 13, 14, which will be explained in more detail in the description relating to FIGS. 5 and 6.

Figure 3:
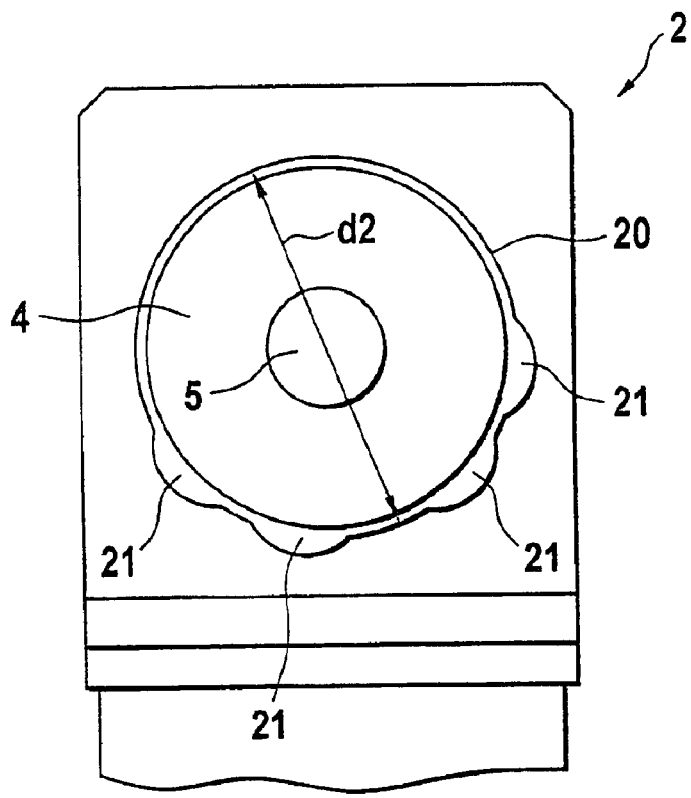
FIG. 3 is a top view of a housing of a right angle grinder with a receiving collar according to the invention.
Figure 4:
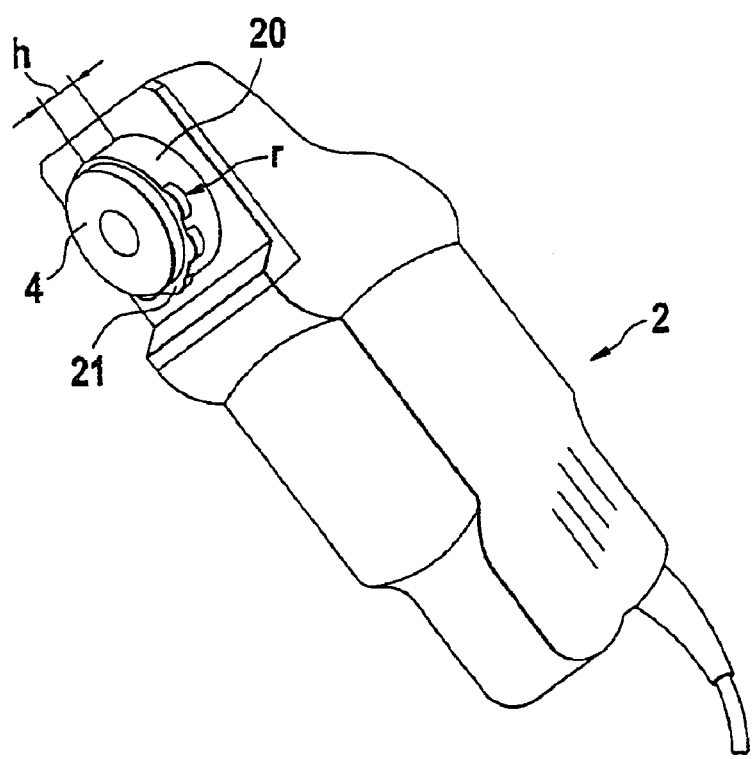
FIG. 4 is a perspective view of the housing of the right angle grinder from FIG. 3.

FIGS. 3 and 4 show two views of a housing 2 for a right angle grinder 3 (FIGS. 5 to 8). A receiving collar 20 is disposed concentrically around a spindle axle 5 and is used to fasten the guard hood 1 to the housing 2. Over most of its area, the receiving collar 20 has a diameter that corresponds to the second diameter d2 of the guard hood 1 when the clamping element 13, 14 is closed. A number of protrusions 21 protrude beyond this second diameter d2, outward in the radial direction from the spindle axle 5. These protrusions have the shape of circular segments. A total of four protrusions 21 are provided, whose shape corresponds to that of the indentations 12 on the clamping strap 16. At the same time, the number of protrusions 21 corresponds to the number of indentations 12. In the axial direction, the receiving collar 20 has a height h, which essentially corresponds to the width b of the clamping strap 16; the height h can be slightly greater than the width b. The protrusions 21 are embodied in the axial direction on the housing 2 so that they constitute the negative form of the transition region 15 of the guard hood 1.

A support flange 4 is also embodied concentric to the spindle axle 5 and serves to support an insert tool (not shown). This support flange 4 has a diameter that is only slightly smaller than the second diameter d2 of the clamping strap 16 in its closed position.

Figure 5:
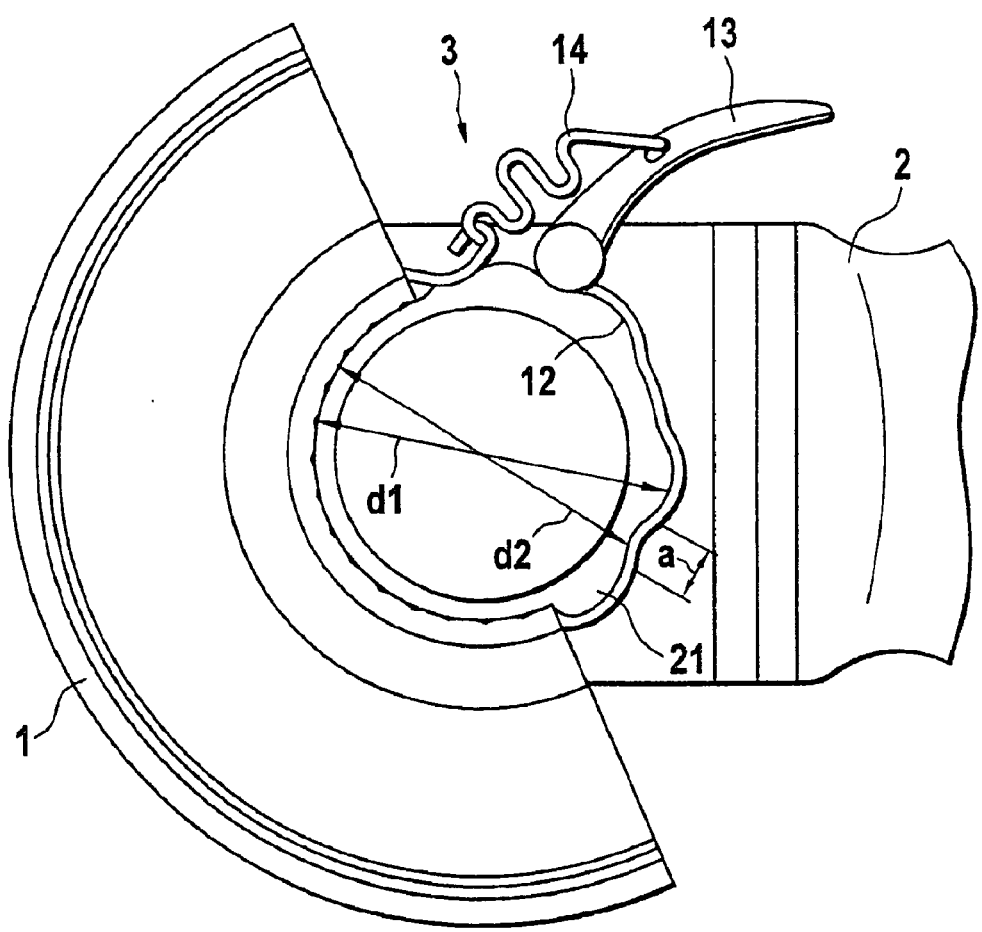
FIG. 5 is a top view of a right angle grinder with the housing of FIGS. 3 and 4 and with the guard hood of FIGS. 1 and 2 in its installed position.
Figure 6:
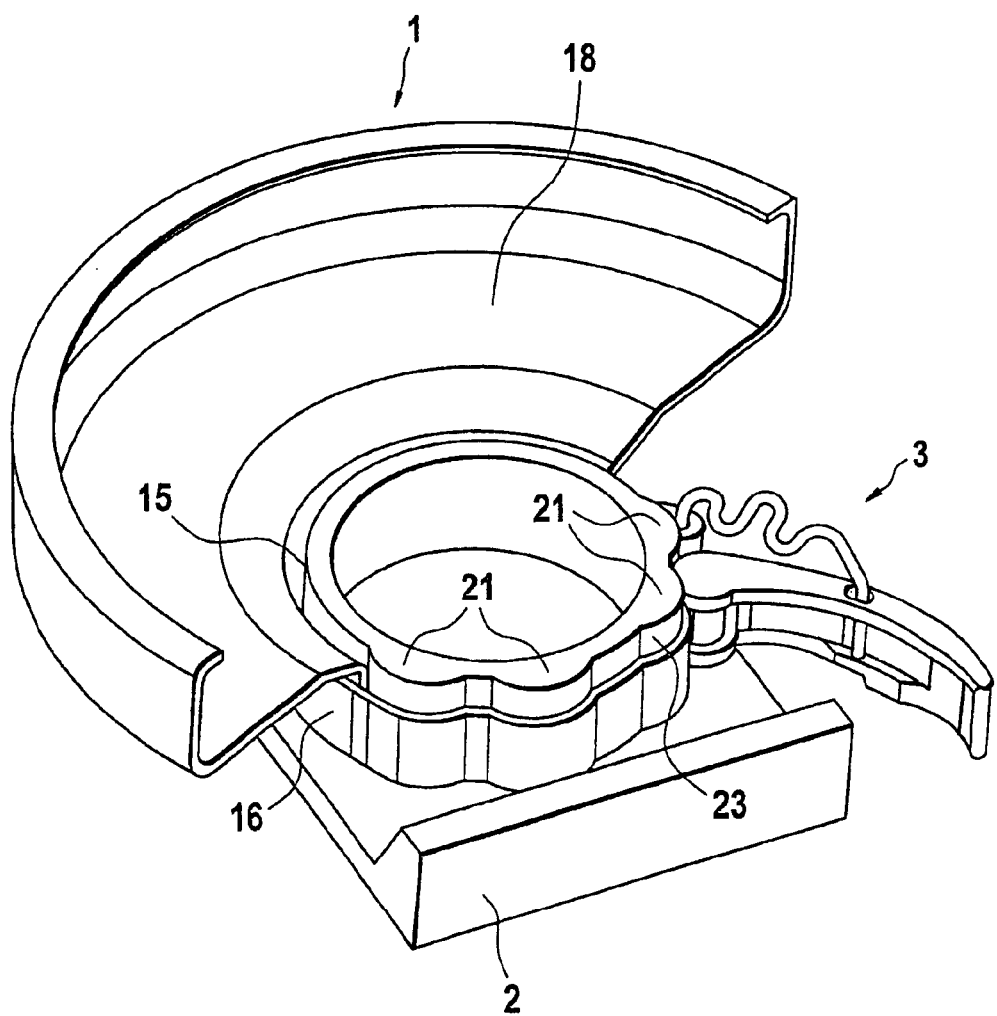
FIG. 6 is a perspective view of the right angle grinder from FIG. 5.

FIGS. 5 and 6 show two views of a right angle grinder 3; the guard hood 1 is shown in a position in which it is mounted directly onto the housing 2. The clamping strap 16 here is shown in its open position, i.e. the area F of the opening 10 is at its greatest in this position. The protrusions 21 of the receiving collar 20 and the recesses of the clamping strap 16 are respectively embodied as a positive and negative form. Both the recesses 12 and the protrusions 21 have an identical distance a between respective adjoining elements. It is therefore possible for the opening 10 of the clamping strap 16 to be slid over the receiving collar 20 until the entire width b of the clamping strap 16 lies beneath the protrusions 21 of the receiving collar 20, i.e. within the height h of the receiving collar 20. The position of the guard hood 1 in relation to the housing 2 of the right angle grinder 3 is selected so that the right angle grinder 3 cannot be logically used for either cutting or grinding. The reciprocally matched protrusions 21 and recesses 12 also permit the guard hood 1 to be mounted only in this one special position. In any other position of the guard hood 1 in relation to the housing 2, it is not possible to slide the clamping strap 16 over the protrusions 21 of the receiving collar 20 since they do not coincide with the recesses 12 of the clamping strap 16. Through the embodiment of the protrusions 21, which point away from the spindle axle 5, and the recesses 12, which likewise point away from the spindle axle 5, it is also possible to mount the guard hood 1 on a right angle grinder 3 that has a wide support flange 4. Even with a support flange 4 that has a diameter, which is only slightly smaller than the second diameter d2, it is possible to mount the guard hood 1 without first having to remove the support flange 4. From the mounting position shown in FIGS. 5 and 6, it is possible to switch over into one of the positions shown in FIGS. 7 and 8 through a simple rotation of the guard hood 1. The guard hood 1 is rotated within the area of the receiving collar 20, which has the height h. The geometry of the protrusions 21 in the axial direction is embodied in a transition region 23 from the first diameter d1 to the second diameter d2. This transition region 23 is embodied with a predetermined radius r, which corresponds to the radius r in the transition region 15 of the guard hood 1. As a result, a positive and negative form with regard to the guard hood 1 and the receiving collar 20 are produced in the axial direction as well. As a result, the guard hood 1, which is disposed in a working position, is secured against coming off, even when the clamping element 13, 14 is released.

Figure 7:
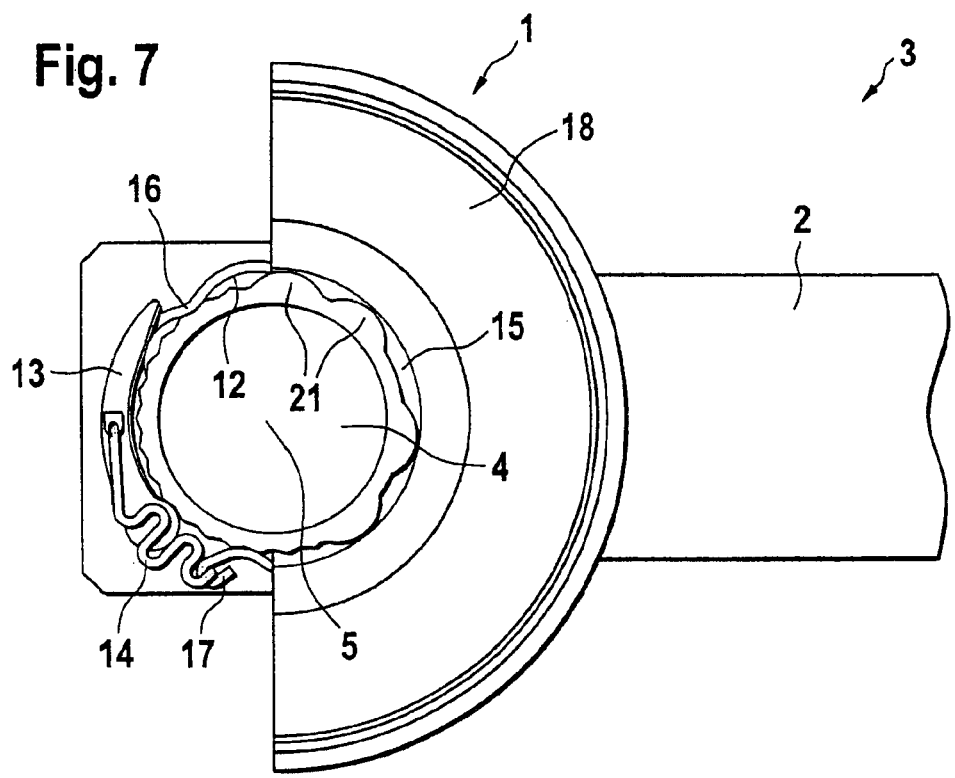
FIG. 7 is a top view of the right angle grinder with the guard hood in a first working position.
Figure 8:
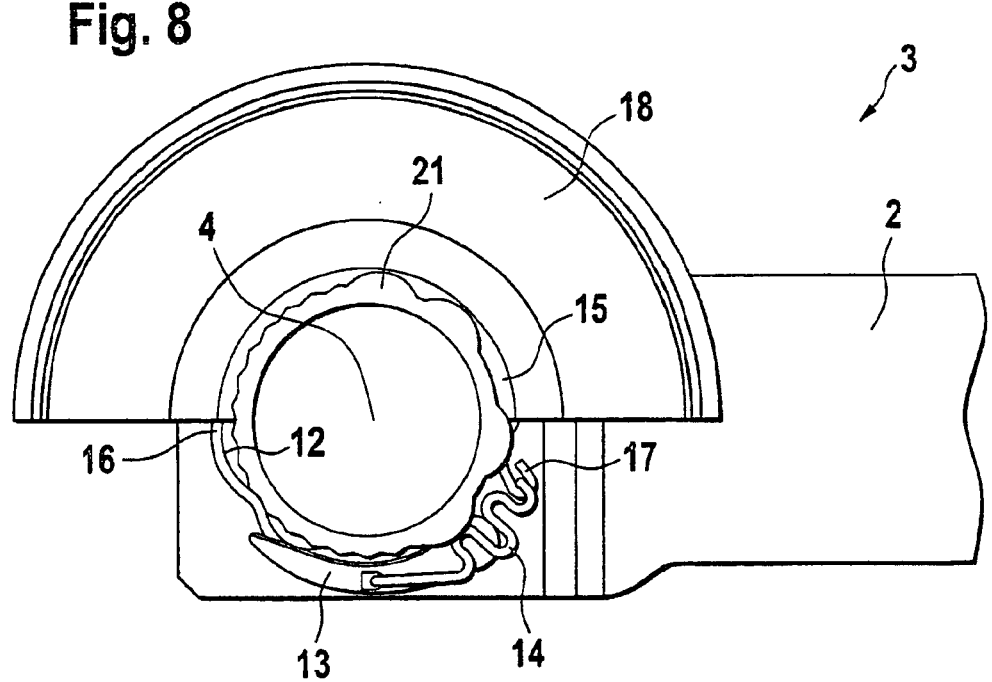
FIG. 8 is a top view of the right angle grinder from FIG. 7, whose guard hood is disposed in a second working position.

FIGS. 7 and 8 show the right angle grinder 3 with the guard hood 1 in two working positions. As a rule, the right angle grinder 3 is used for grinding in the working position shown in FIG. 7 and is used for cutting in the working position shown in FIG. 8. In the two positions of the guard hood 1 shown the recesses 12 of the clamping strap 16 are not congruent with the protrusions 21 on the receiving collar 20. In addition, the clamping strap 16 is tightened by means of the clamping element 13, 14 until it rests snugly against the receiving collar 20. The firm pressure of the clamping strap 16 against the receiving collar 20 prevents the guard hood 1 from rotating in relation to the housing 2 into the only possible mounting position depicted in FIGS. 5 and 6. Even if the clamping element 13,14 is released, the guard hood 1 cannot be detached from the receiving collar 20 since the protrusions 21 of the receiving dollar 20 and the recesses 12 of the clamping strap 16 do hot coincide with one another. In addition, the positive and negative form of the transition region 23 on the receiving collar 20 and of the transition region 15 on the guard hood 1 prevents the guard hood 1 from coming off.

What is claimed is:

1. A hand-guided electrical tool (3), with a housing (2) that has a receiving collar (20) embodied on it, which is disposed around a spindle axle (5) for a tool, and with a guard hood (1) that can be attached to the receiving collar (20) and has a hood part (18) and a clamping strap (16), whose opening (10) has a changeable area (F), which a clamping element (13, 14) can shift between a first position in which the clamping strap (16) can move freely around the receiving collar (20) and a second position in which it rests snugly against the receiving collar (20), characterized in that the receiving collar (20) has at least one protrusion (21), which protrudes beyond a second area in the radial direction away from the spindle axle (5), and between the protrusion (21) and the housing (2), there is a distance (h), which approximately corresponds to the width (b) of the clamping strap (16), and that the clamping strap (16) has at least one recess (12) so that the first diameter (d1) of the opening (10) of the clamping strap (16) in the vicinity of the recess (12) is greater than the second diameter (d2) in the remaining region, wherein the first diameter (d1) is of such a size that the clamping strap (16) can be moved over the protrusion (21) and the second diameter (d2) is of such a size that the clamping strap (16) cannot be moved over the protrusion (21).

2. The electrical tool (3) according to claim 1, wherein the protrusion (21) and the recess (12) are disposed so that the guard hood (1) can be slid over the protrusion (21) only in a non-operable position of the electrical tool (3).

3. The electrical tool (3) according to claim 1, wherein the protrusion (21) and/or the recess (12) are the shape of circular segments in the axial direction of the spindle axle (5).

4. The electrical tool (3) according to claim 1, wherein the clamping element (13, 14) has a region which is embodied as a recess (12).

5. The electrical tool (3) according to claim 1, wherein it has a number of protrusions (21) and recesses (12), which are disposed at matched distances (a).

6. The electrical tool (3) according to claim 1, wherein the protrusions (21) and recesses (12) each have different matched sizes and/or distances (a) from one another.

7. The electrical tool (3) according to claim 1, further comprising a support flange (4), which is disposed concentrically around the spindle axle (5) and whose diameter is only slightly smaller than that of the receiving collar (20).

8. The electrical tool (3) according to claim 1, wherein in the axial direction of the spindle axle (5), the protrusion (21) and the hood part (18) have a positive and negative form.

9. The electrical tool (3) according to claim 1, wherein the positive and negative form in a transition region (15) between the clamping strap (16) and the hood part (18) are respectively embodied in the form of a circumferential edge, a radius (r), and/or a conical shape.

\* \* \* \* \*